United States Patent
Viehmann

(10) Patent No.: US 11,618,442 B2
(45) Date of Patent: *Apr. 4, 2023

(54) VEHICLE CONTROL SYSTEM FOR EMERGENCY HANDLING

(71) Applicant: Magna Electronics Inc., Auburn Hills, MI (US)

(72) Inventor: Alexander F. Viehmann, Amorbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/248,116

(22) Filed: Jan. 11, 2021

(65) Prior Publication Data

US 2021/0129835 A1    May 6, 2021

Related U.S. Application Data

(63) Continuation of application No. 16/203,976, filed on Nov. 29, 2018, now Pat. No. 10,889,293, which is a
(Continued)

(51) Int. Cl.
*B60W 30/09*    (2012.01)
*B62D 9/00*     (2006.01)
(Continued)

(52) U.S. Cl.
CPC ............ *B60W 30/09* (2013.01); *B60W 10/18* (2013.01); *B60W 10/20* (2013.01); *B60W 30/02* (2013.01);
(Continued)

(58) Field of Classification Search
CPC ...... B60W 10/18; B60W 10/20; B60W 30/02; B60W 30/09; B60W 30/18172;
(Continued)

(56) References Cited

U.S. PATENT DOCUMENTS 5,432,509 A    7/1995    Kajiwara
5,541,590 A    7/1996    Nishio
(Continued)

FOREIGN PATENT DOCUMENTS

AU    2011244950 A1 *  6/2012    ............ B60W 10/04
CN    114763167 A *  7/2022    .......... B60W 60/007
(Continued)

*Primary Examiner* — Atul Trivedi
(74) *Attorney, Agent, or Firm* — Honigman LLP

(57) ABSTRACT

A method for controlling a vehicle to make an emergency stop of the vehicle providing a camera and an electronic control unit (ECU) at the vehicle. Presence of a road condition is determined at the road along which the vehicle is traveling. Responsive to determining an emergency driving condition while the vehicle is traveling along the road at the road condition, the ECU at least partially controls driving of the vehicle along the road. While the ECU is at least partially controlling driving of the vehicle along the road, and responsive to determining an end of the road condition, a target stopping location is determined ahead of the vehicle at the road along which the vehicle is traveling and after the end of the road condition. The ECU at least partially controls driving of the vehicle to the target stopping location.

21 Claims, 4 Drawing Sheets

Related U.S. Application Data continuation of application No. 15/358,166, filed on Nov. 22, 2016, now Pat. No. 10,144,419.

(60) Provisional application No. 62/398,091, filed on Sep. 22, 2016, provisional application No. 62/258,722, filed on Nov. 23, 2015.

(51) Int. Cl.

| | |
|---|---|
| *B62D 15/02* | (2006.01) |
| *B60W 10/18* | (2012.01) |
| *B60W 10/20* | (2006.01) |
| *B60W 30/02* | (2012.01) |
| *B60W 30/18* | (2012.01) |
| *G06V 20/56* | (2022.01) |

(52) U.S. Cl.
CPC ....... B60W 30/18172 (2013.01); B62D 9/005 (2013.01); B62D 15/0265 (2013.01); G06V 20/588 (2022.01); *B60W 2530/20* (2013.01); *B60W 2552/40* (2020.02)

(58) Field of Classification Search
CPC .......... B60W 2530/20; B60W 2552/40; B62D 9/005; B62D 15/0265; G06V 20/588
USPC .......................................................... 701/23
See application file for complete search history.

(56) References Cited

U.S. PATENT DOCUMENTS

| | | |
|---|---|---|
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,949,331 A | 9/1999 | Schofield et al. |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,178,034 B1 | 1/2001 | Allemand et al. |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,317,057 B1 | 11/2001 | Lee |
| 6,320,282 B1 | 11/2001 | Caldwell |
| 6,333,759 B1 | 12/2001 | Mazzilli |
| 6,370,329 B1 | 4/2002 | Teuchert |
| 6,392,315 B1 | 5/2002 | Jones et al. |
| 6,430,303 B1 | 8/2002 | Naoi et al. |
| 6,442,465 B2 | 8/2002 | Breed et al. |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,735,506 B2 | 5/2004 | Breed et al. |
| 6,744,353 B2 | 6/2004 | Sjonell |
| 6,762,867 B2 | 7/2004 | Lippert et al. |
| 6,795,221 B1 | 9/2004 | Urey |
| 6,819,231 B2 | 11/2004 | Berberich et al. |
| 6,823,241 B2 | 11/2004 | Shirato et al. |
| 6,879,890 B2 | 4/2005 | Matsumoto et al. |
| 6,889,161 B2 | 5/2005 | Winner et al. |
| 6,909,753 B2 | 6/2005 | Meehan et al. |
| 6,975,775 B2 | 12/2005 | Rykowski et al. |
| 6,989,736 B2 | 1/2006 | Berberich et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,952,490 B2 | 5/2011 | Fechner et al. |
| 3,027,029 A1 | 9/2011 | Lu et al. |
| 8,340,866 B2 | 12/2012 | Hanzawa et al. |

(56) References Cited

U.S. PATENT DOCUMENTS

| | | |
|---|---|---|
| 8,788,176 B1 | 7/2014 | Yopp |
| 8,849,495 B2 | 9/2014 | Chundrik, Jr. et al. |
| 8,935,088 B2 | 1/2015 | Matsubara |
| 9,008,369 B2* | 4/2015 | Schofield ............... B60R 1/00 382/104 |
| 9,082,239 B2 | 7/2015 | Ricci |
| 9,090,234 B2 | 7/2015 | Johnson et al. |
| 9,092,986 B2 | 7/2015 | Salomonsson et al. |
| 9,176,924 B2 | 11/2015 | Ricci |
| 9,205,864 B2 | 12/2015 | Matsubara |
| 9,384,609 B2 | 7/2016 | Ricci |
| 9,466,161 B2 | 10/2016 | Ricci |
| 9,524,597 B2 | 12/2016 | Ricci |
| 9,545,930 B2 | 1/2017 | Ricci |
| 9,751,534 B2 | 9/2017 | Fung et al. |
| 9,862,380 B2 | 1/2018 | Minoiu Enache |
| 9,925,980 B2 | 3/2018 | Edo-Ros |
| 10,144,419 B2 | 12/2018 | Viehmann |
| 10,889,293 B2 | 1/2021 | Viehmann |
| 2002/0113873 A1 | 8/2002 | Williams |
| 2002/0118862 A1 | 8/2002 | Sugimoto et al. |
| 2003/0137586 A1 | 7/2003 | Lewellen |
| 2003/0222982 A1 | 12/2003 | Hamdan et al. |
| 2004/0022416 A1 | 2/2004 | Lemelson et al. |
| 2004/0114381 A1 | 6/2004 | Salmeen et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0255920 A1 | 11/2006 | Maeda et al. |
| 2006/0290479 A1 | 12/2006 | Akatsuka et al. |
| 2007/0104476 A1 | 5/2007 | Yasutomi et al. |
| 2008/0133136 A1* | 6/2008 | Breed ............... G05D 1/0274 340/901 |
| 2008/0150786 A1* | 6/2008 | Breed ............... B60W 30/16 342/53 |
| 2008/0154629 A1* | 6/2008 | Breed ............... B60N 2/2863 701/70 |
| 2008/0243389 A1 | 10/2008 | Inoue et al. |
| 2009/0093938 A1 | 4/2009 | Isaji et al. |
| 2009/0113509 A1 | 4/2009 | Tseng et al. |
| 2009/0171559 A1 | 7/2009 | Lehtiniemi et al. |
| 2009/0177347 A1 | 7/2009 | Breuer et al. |
| 2009/0228174 A1 | 9/2009 | Takagi et al. |
| 2009/0244361 A1 | 10/2009 | Gebauer et al. |
| 2009/0265069 A1 | 10/2009 | Desbrunes |
| 2010/0020170 A1 | 1/2010 | Higgins-Luthman et al. |
| 2010/0228437 A1 | 9/2010 | Hanzawa et al. |
| 2011/0115615 A1 | 5/2011 | Luo et al. |
| 2011/0157309 A1 | 6/2011 | Bennett et al. |
| 2011/0224978 A1 | 9/2011 | Sawada |
| 2011/0282516 A1 | 11/2011 | Lich et al. |
| 2012/0035846 A1 | 2/2012 | Sakamoto et al. |
| 2012/0044066 A1 | 2/2012 | Mauderer et al. |
| 2012/0062743 A1 | 3/2012 | Lynam et al. |
| 2012/0083960 A1 | 4/2012 | Zhu et al. |
| 2012/0218412 A1 | 8/2012 | Dellantoni et al. |
| 2012/0262340 A1 | 10/2012 | Hassan et al. |
| 2013/0002873 A1 | 1/2013 | Hess |
| 2013/0116859 A1 | 5/2013 | Ihlenburg et al. |
| 2013/0124052 A1 | 5/2013 | Hahne |
| 2013/0129150 A1 | 5/2013 | Saito |
| 2013/0131905 A1 | 5/2013 | Green et al. |
| 2013/0131907 A1 | 5/2013 | Green et al. |
| 2013/0131918 A1 | 5/2013 | Hahne |
| 2013/0141578 A1 | 6/2013 | Chundrlik, Jr. et al. |
| 2013/0222593 A1 | 8/2013 | Byrne et al. |
| 2013/0278769 A1 | 10/2013 | Nix et al. |
| 2013/0314503 A1 | 11/2013 | Nix et al. |
| 2014/0044310 A1 | 2/2014 | Schamp et al. |
| 2014/0067206 A1 | 3/2014 | Pflug |
| 2014/0156157 A1* | 6/2014 | Johnson ............... B60T 7/22 701/70 |
| 2014/0222280 A1 | 8/2014 | Salomonsson et al. |
| 2014/0267689 A1* | 9/2014 | Lavoie ............... B60W 10/18 348/113 |
| 2014/0303845 A1* | 10/2014 | Hartmann ............ B60W 10/20 701/41 |
| 2014/0313335 A1* | 10/2014 | Koravadi ............. H04N 23/62 348/148 |
| 2014/0313339 A1 | 10/2014 | Diessner |
| 2014/0379233 A1* | 12/2014 | Chundrlik, Jr. ......... G06V 20/58 701/70 |
| 2015/0046038 A1 | 2/2015 | Kawamata et al. |
| 2015/0158499 A1* | 6/2015 | Koravadi ............... B60T 7/18 701/1 |
| 2015/0158527 A1 | 6/2015 | Hafner et al. |
| 2015/0166062 A1* | 6/2015 | Johnson ............... B60W 10/20 701/41 |
| 2015/0177007 A1* | 6/2015 | Su ............... B60W 30/165 701/25 |
| 2015/0203109 A1* | 7/2015 | McClain ............ B60T 8/17557 701/1 |
| 2015/0203156 A1 | 7/2015 | Hafner et al. |
| 2015/0284008 A1* | 10/2015 | Tan ............... G05D 1/0231 701/28 |
| 2015/0344028 A1 | 12/2015 | Gieseke et al. |
| 2016/0090100 A1 | 3/2016 | Oyama et al. |
| 2016/0121906 A1 | 5/2016 | Matsuno et al. |
| 2016/0133130 A1 | 5/2016 | Grimm et al. |
| 2016/0133131 A1 | 5/2016 | Grimm et al. |
| 2016/0339959 A1 | 11/2016 | Lee |
| 2016/0362050 A1 | 12/2016 | Lee et al. |
| 2016/0362118 A1 | 12/2016 | Mollicone et al. |
| 2016/0375766 A1 | 12/2016 | Konet et al. |
| 2016/0375767 A1 | 12/2016 | Konet et al. |
| 2016/0375768 A1 | 12/2016 | Konet et al. |
| 2017/0036673 A1 | 2/2017 | Lee |
| 2017/0060234 A1 | 3/2017 | Sung |
| 2017/0124987 A1 | 5/2017 | Kim et al. |
| 2017/0358155 A1 | 12/2017 | Krapf et al. |
| 2018/0299887 A1* | 10/2018 | Cashier ............... G05D 1/0234 |
| 2018/0364700 A1 | 12/2018 | Liu et al. |
| 2018/0364701 A1 | 12/2018 | Liu et al. |
| 2018/0364702 A1 | 12/2018 | Liu et al. |
| 2018/0364703 A1 | 12/2018 | Liu et al. |
| 2018/0364704 A1 | 12/2018 | Liu et al. |
| 2018/0365908 A1 | 12/2018 | Liu et al. |
| 2019/0302781 A1* | 10/2019 | Tao ............... G05D 1/0214 |
| 2019/0361439 A1 | 11/2019 | Zeng et al. |
| 2019/0361454 A1 | 11/2019 | Zeng et al. |
| 2019/0361456 A1 | 11/2019 | Zeng et al. |
| 2019/0367021 A1 | 12/2019 | Zhao et al. |
| 2019/0369623 A1 | 12/2019 | Sadakiyo et al. |
| 2020/0180612 A1 | 6/2020 | Finelt et al. |
| 2021/0035442 A1* | 2/2021 | Baig ............... G08G 1/0175 |
| 2021/0197858 A1* | 7/2021 | Zhang ............ B60W 60/0015 |
| 2021/0221389 A1* | 7/2021 | Long ............... B60W 50/029 |
| 2022/0063678 A1* | 3/2022 | McPeek-Bechtold ............... B60W 60/0051 |
| 2022/0119011 A1* | 4/2022 | Li ............... G08G 1/166 |
| 2022/0176987 A1* | 6/2022 | Russell ............ B60W 60/001 |
| 2022/0185313 A1* | 6/2022 | Wang ............... G06F 18/2415 |
| 2022/0222597 A1* | 7/2022 | Neese ............ G06Q 10/06311 |
| 2022/0230537 A1* | 7/2022 | Whyte ............... G06V 20/56 |

FOREIGN PATENT DOCUMENTS

| | | | |
|---|---|---|---|
| GB | 2524393 A * | 9/2015 | ........ B60W 50/0225 |
| WO | WO-2016130719 A2 * | 8/2016 | ............ B60W 30/10 |
| WO | WO-2022009900 A1 * | 1/2022 | |
| WO | WO-2022159173 A1 * | 7/2022 | ......... G06K 9/00791 |

* cited by examiner

VEHICLE CONTROL SYSTEM FOR EMERGENCY HANDLING

CROSS REFERENCE TO RELATED APPLICATIONS

The present application is a continuation of U.S. patent application Ser. No. 16/203,976, filed Nov. 29, 2018, now U.S. Pat. No. 10,889,293, which is a continuation of U.S. patent application Ser. No. 15/358,166, filed Nov. 22, 2016, now U.S. Pat. No. 10,144,419, which claims the filing benefits of U.S. provisional application Ser. No. 62/398,091, filed Sep. 22, 2016, and U.S. provisional application Ser. No. 62/258,722, filed Nov. 23, 2015, which are hereby incorporated herein by reference in their entireties.

FIELD OF THE INVENTION

The present invention relates generally to a vehicle vision and control system for a vehicle and, more particularly, to a vehicle vision and control system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a control that, responsive to a determination of an emergency driving condition, controls steering and braking of the vehicle to guide the vehicle to a targeted stopping location.

According to an aspect of the present invention, a driver assistance system of a vehicle comprises a control operable to control steering of the vehicle and braking of the vehicle responsive to a determination of an emergency driving event. The control, responsive to a determination of a lane in which the vehicle is traveling, and responsive to the determination of an emergency driving event, controls the steering of the vehicle to steer the vehicle along the determined lane. The control does not control braking of the vehicle to quickly stop the vehicle responsive to an input from the driver indicative of the driver not wanting to stop the vehicle.

The control may be operable to determine a targeted stopping location and may control steering of the vehicle and braking of the vehicle to guide the vehicle to and stop the vehicle at the targeted stopping location. The control may determine the targeted stopping location substantially ahead of the vehicle and after a road condition changes. The determined road condition change may comprise one of (i) a construction zone ending, (ii) a narrow road widening and (iii) a shoulder of the road beginning.

The input from the driver may comprise the driver accelerating the vehicle, which indicates that the vehicle is not to be stopped at that location, even though an emergency driving event (such as a blown tire) may have been determined by the control. The control may determine the emergency driving condition responsive to one or more sensors of the vehicle and may switch the system into an emergency steering mode. The lane may be determined responsive to image processing of image data captured by a camera disposed at the vehicle and having a field of view exterior and forward of the vehicle.

Responsive to a determination of an emergency driving event, the control switches to operate under the emergency steering mode and steers the vehicle to maintain the vehicle moving along the determined path of travel. The control (while operating in the emergency steering mode) may also control braking at individual ones of the wheels of the vehicle to assist in guiding the vehicle along the determined path of travel. The control (while operating in the emergency steering mode) may also control driving (such as accelerating or decelerating) of individual ones of the wheels of the vehicle to assist in guiding the vehicle along the determined path of travel.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
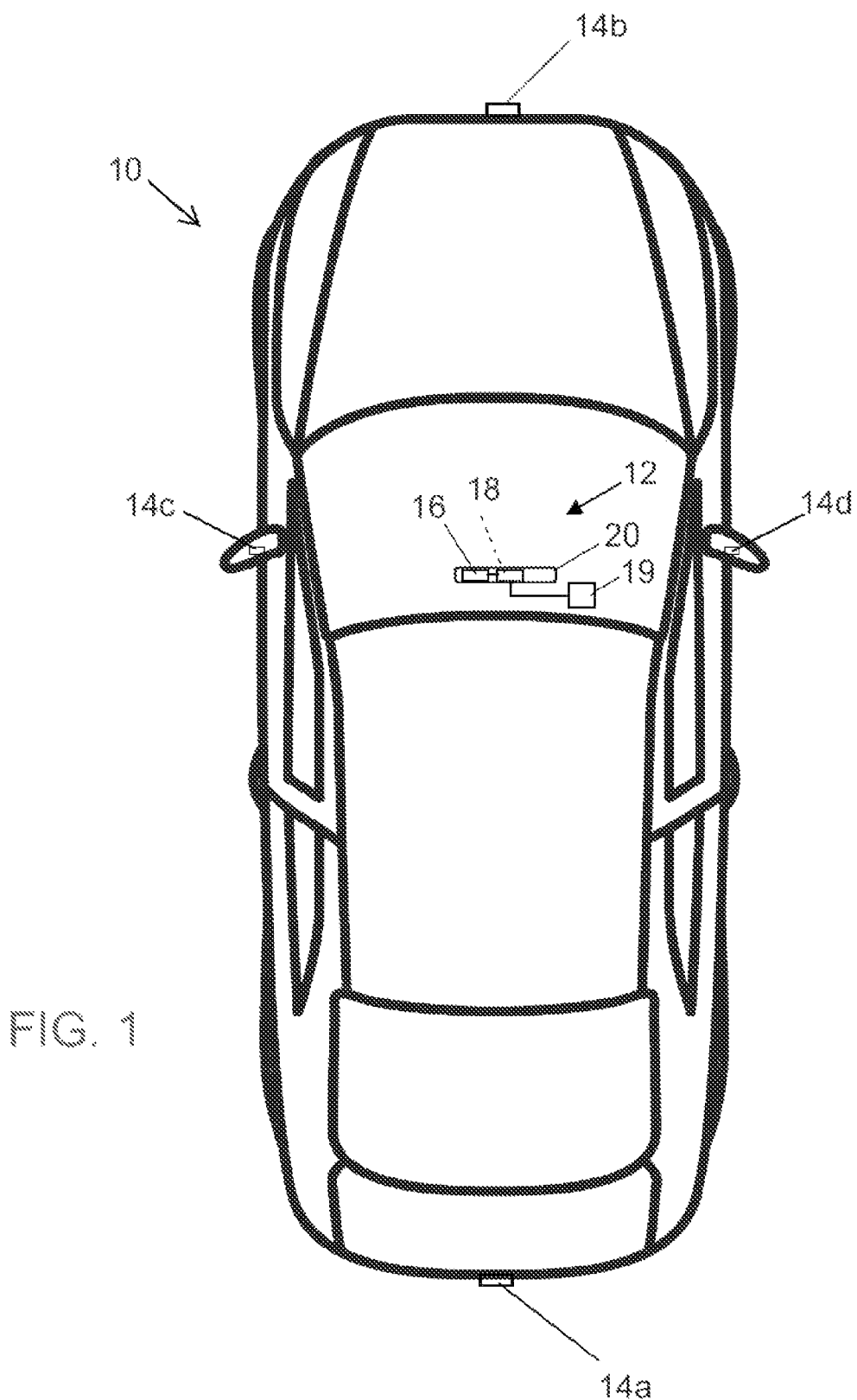
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention combines perception systems of advanced driver assistant and safety systems (or optionally similar detection systems just for that purpose instead of driver assistant system born sensors) with vehicle torque-, traction-, stability- and steering control systems to generate an added value to the whole, especially in critical maneuvering situations. The combined control 19 may be located anywhere in the vehicle, and may be linked to vehicle sensors and sensor processing system including the vision ECU 12.

The system may exceed known electronic stability program (ESP) or electronic stability control intervention for lane keeping assist (LKA) in functionality, effectiveness and comfort, by using more input data and controlled drivetrain areas. Contrary to known systems, the system of the present invention may be activated or stay activated also if ABS, ESP®, Brake Assist or another active safety system intervene, or when a tire runs flat or bursts or after a collision event.

For example, at least the active lane keep assist (LKA) may be combined or fused with at least the electronic stability control (ESC) (also called VSC, ESP) in a way that the LKA may detect and provide the desired boundaries of a safe vehicle path or 'free space' (by that the set point) in which a vehicle is supposed to remain supported by the ESC control interventions. The focus may be set on controlling the vehicle safely on a non-collision path when in an emergency situation. Such a situation may occur when a tire bursts abruptly or the vehicle loses traction on a slippery road, such as due to hydroplaning, ice conditions or snow conditions. Typically staying in the road's boundaries or within the current lane markings is preferred as safer than departing from the road or lane unintentionally. The system of the present invention may control the vehicle within the road's or lane boundaries also when traveling in or along or just entering a curve in the road.

The system of the present invention may be further improved by also taking collision mitigation steering and braking functions into account. The system may set a desired collision avoidance or mitigation path (see the example of FIG. 4, where an unequipped subject vehicle (SV) may travel into a crash (path a) while a vehicle equipped with the emergency steering control according the invention may not (path b)), which then may be followed as best as controllable by steering, braking and torque applying interventions (see further advanced system below). The path or road may include curves (see FIG. 3) and may lead across one or several lanes. By that, the system may not necessarily stick to the initial lane. In some severe cases, the selected collision avoidance or mitigation path may lead off the former road or road's shoulder. A further advanced system may not just brake single wheels for stabilizing the vehicle but it may distribute positive or negative torque induced by the combustion engine (such as, for example, by a variable differential or simulated variable differential such as Actimax™ or the like) or by electrical or other type of motors or turbines (single wheel (hub) motors or central drive train motors or motors added to the combustion engine (hybrid)) to the individual wheels to stabilize the vehicle against slinging and to take influence to the direction the vehicle is heading to.

Supposedly, the driver is interested in bringing the vehicle to a halt in emergency situations (during emergency steering mode) or the collision mitigation braking (CMB) system is signaling a collision hazard, by that the system may assist by slowing down the vehicle in a controlled manner. CMB systems are typically made in a way that the driver is able to override the function. For example, when the driver steps onto the accelerator while the CMB system is controlling the brakes of the vehicle, the CMB system will switch off so as to not interfere the driver's intention to accelerate. The full shut off of the assistance system may be suboptimal though. There may be situations at which an automatically induced stopping is not desired, such as, for example, when there is a tire burst emergency when crossing a construction site at which the driver does not want to stop his or her vehicle but to continue driving until exiting the construction site. By that the driver may be free in his or her decision when to brake to slow down the vehicle, also when being in a mode of emergency such as having a blown tire. The system of the present invention may stay activated in aiding to steer, accelerate and decelerate, while not braking to stop the vehicle or switching off the assistance system.

For achieving this, the vehicle's vision and environmental sensor system may optionally fuse and process the scene data to generate an environmental scene's map, which then may optionally be processed by a scene understanding and context classification algorithm, such as by utilizing aspects of the systems and algorithms described in U.S. Publication No. US-2015-0344028, which is hereby incorporated herein by reference in its entirety, for the purpose of finding proper emergency stopping points or locations and safe paths to the determined stopping point or points or locations, including executing lane changes and turning maneuvers as well as acceleration and deceleration maneuvers within the remaining extent of travel to the determined stopping point or location (this may be desired by the driver anyways or may be necessary in situations where the driver is unable to drive due to an emergency situation occurring, such as if the driver becomes unconscious or non-responsive). Optionally, the system may determine a targeted stopping location ahead of the vehicle and may control the vehicle to drive the vehicle to and stop the vehicle at the targeted location (safe harbor maneuver). Optionally, the system may, responsive to, for example, a determination that the vehicle is at a construction zone or otherwise at an area where the vehicle cannot be pulled over (such as a narrowed road before it widens or a road without a shoulder with a shoulder of the road starting or appearing ahead), continue to control the vehicle steering and acceleration/deceleration to guide the vehicle through the determined construction zone to a targeted location where it is safe to steer the vehicle to the side of the road and stop.

The system of the present invention may also be able to control the vehicle along the planned [emergency] path also when the vehicle is not in a fully proper technical state, such as having a blown tire or when the road conditions are bad such as on a snowy road. The scene understanding (or context classification) system may additionally process and provide the road condition status such as dry road, snowy road, icy road, muddy road, wet road or gravel road for being considered in the vehicle control algorithm. For that, drive train sensors or devices may be linked or fused into the scene understanding system.

Optionally, a blown tire may be detected by a direct or indirect tire pressure monitoring system and may also be provided as an input to or fused to the system of the present invention. Optionally, the system may incorporate or activate an emergency support system (ESS) after an occurrence such an emergency stop after a blown tire while operating in the emergency steering mode.

Optionally, all-wheel drive (AWD) (such as Flex4™ and Actimax™) torque distribution systems may also be provided as an input to or fused to the system of the present invention.

Optionally, the acceleration sensors may also be provided as an input to or fused to the system of the present invention.

Optionally, the anti-lock braking system (ABS) may also be provided as an input to or fused to the system of the present invention.

Optionally, the anti-slip regulation (ASR) may also be provided as an input to or fused to the system of the present invention. Optionally, the traction control (TRC) may also be provided as an input to or fused to the system of the present invention. Optionally, the lateral stability control (LSC) may also be provided as an input to or fused to the system of the present invention. Optionally, the roll stability control (RSC) may also be provided as an input to or fused to the system of the present invention.

To follow the path desired by the driver or set by the scene understanding system, the vehicle powertrain may have to be controlled in an abnormal manner or mode or emergency steering mode. That abnormal or emergency mode may be triggered by less severe events such as the vehicle not fully following its steering direction any more, such as when driving in deep snow, sand or gravel, so that the vehicle is understeering due to some floating or vehicle sways and slings due to massive turn changing. The abnormal or emergency mode may be triggered by severe or emergency events such as bouncing off after a [light] collision or mostly losing street contact. For example, the abnormal or emergency mode may be triggered during a jump (when one or more of the wheels lose or substantially lose contact with the ground), or when the street is very slippery on ice or mud or snow, or when any vehicle powertrain part is substantially malfunctioning, such as when a tire runs flat, a tire is blown, a wheel has been lost, a wheel is wobbling (lost some lug nuts), a tire sticks, the gearbox sticks, the engine sticks, the front wheel steering is blocked or is limited to one direction, the real wheel steering (if present) is blocked, the vehicle is not balanced (or greatly imbalanced) due to lost or shifted cargo or vehicle parts, or in case the cargo is a liquid, sloshing cargo, or the rear axle is not aligned any more (possibly after a collision). A wobbling or lost tire may optionally be detected by using a system such as described in U.S. provisional application No. 62/347,836, filed Jun. 9, 2016, which is hereby incorporated herein by reference in its entirety.

In the abnormal mode (or emergency steering mode), the direct or scaled or incrementally scaled linkage of the steering wheel to the normally steered tires may optionally be disconnected and fully machine controlled or replaced by a different behavior than normal. As shown in the lost tire example of FIG. 2, the normally zero position ($\delta=0$) of the steering wheel 24 may not translate to an angle of zero of both [front] steering wheels ($\alpha=0$ and $\beta=0$) when the system of the invention is in abnormal mode (emergency steering mode). Due to the lost right side rear tire at the right side rear wheel or corner assembly 21, the rear end of the vehicle is tending to be unstable and slipping sideward on the road 26. The still intact left rear tire may permanently pull towards the left, since the vehicle has rolled to the right sitting on the right brake disk 23, scratching along the road and has a lower radius than the former tire. When the front wheels would stay straight the vehicle would drive in a curve. To cope with that (and some possible additional drag) the control or system 19 according to the present invention may interfere by directing or steering the front wheels in an angle offset to the left ($\alpha>0$ and $\beta>0$) similar to a 'crab steering' situation (where all four wheels are steered in the same direction), but of course without actively steering the rear wheels. The lane markings 28 and 29 in the example of FIG. 2 are straight, and by that the scene detection and understanding system has taken over full control and controls the vehicle to stay in a straight path 30.

Figure 2:
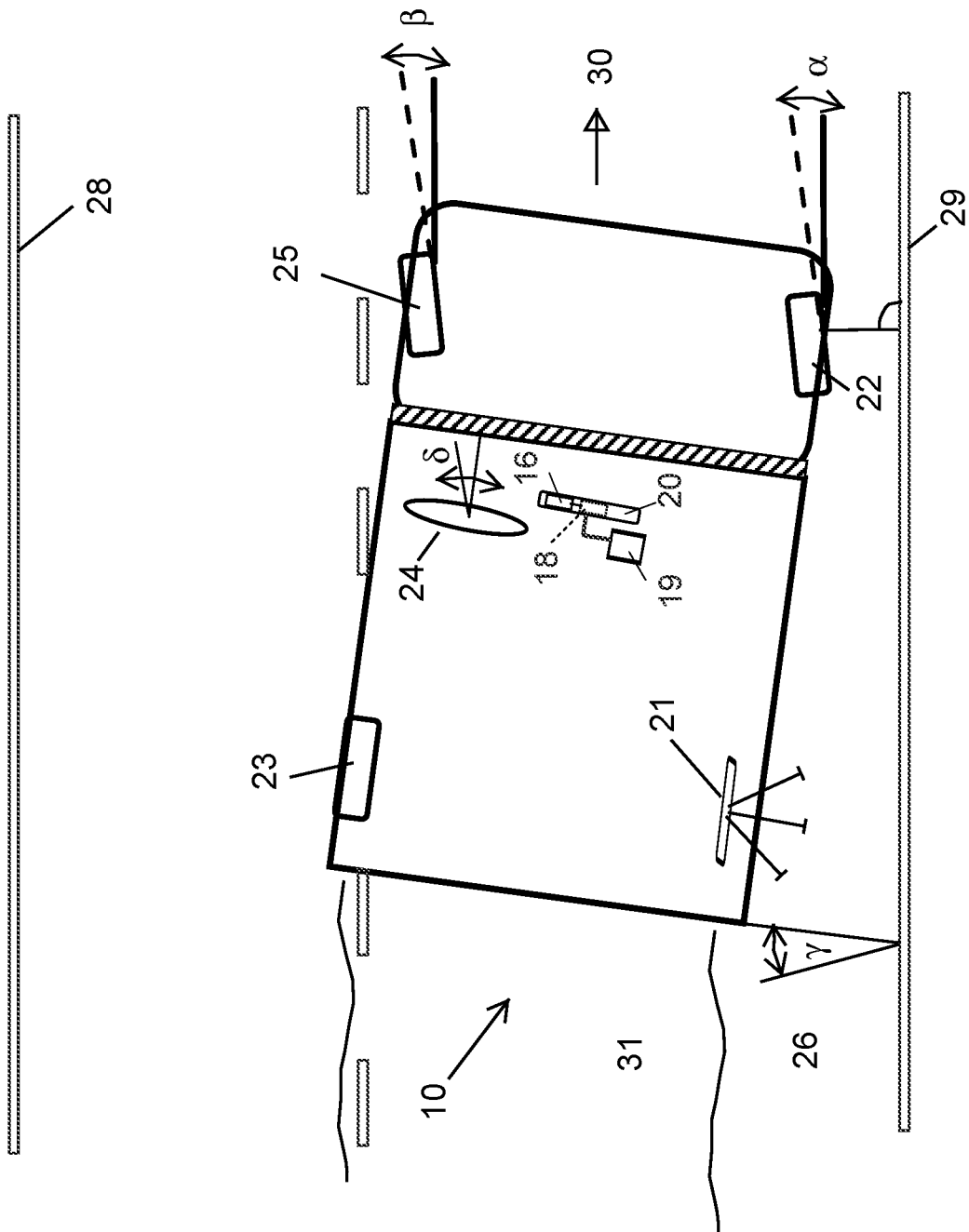
FIG. 2 is a plan view of a front wheel steered vehicle that has lost its right rear tire and is running on its brake disk, with the left rear tire intact and straight, showing the vehicle driving generally straight on a road having two straight lane markings that are detected by a vision detection, processing and scene understanding system of the present invention.

In accordance with the example of FIG. 2, the system 19 may optionally counter the skid tendency of the vehicle's rear by slightly braking the left front left wheel 25, while optionally applying moderate torque to the right front wheel 22 and optionally braking the rear left wheel when swinging outbound (to the left) and optionally lifting or releasing the brake when swinging inbound (to the right). Optionally, the system 19 may apply more negative torque to the system than positive over all, in order to decelerate the vehicle. Optionally, the system 19 may detect the inherent periodic occurrence of the swinging tendency and may apply the counter measures in $\pi/2$ advanced for calming down the swinging.

Figure 3:
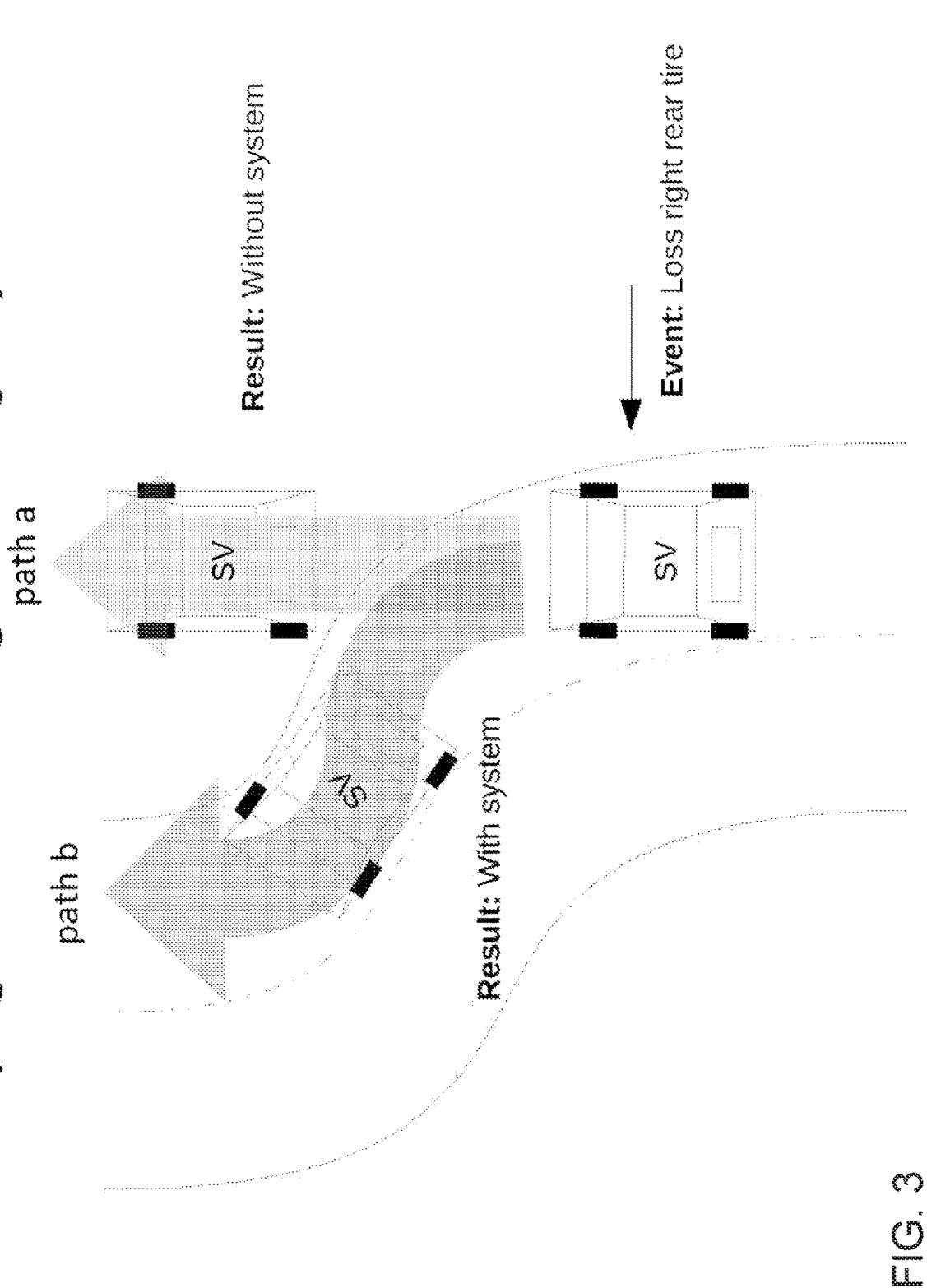
FIG. 3 is a view of a curved street the subject vehicle (SV) is driving at, showing a path 'a' shown leading off the road boundaries of a vehicle not equipped with the control system of the present invention, such as when losing a tire, and showing a safe path 'b' that a vehicle equipped with the control system of the present invention may take staying within the road boundaries when losing a tire, even though the path is curved.
Figure 4:
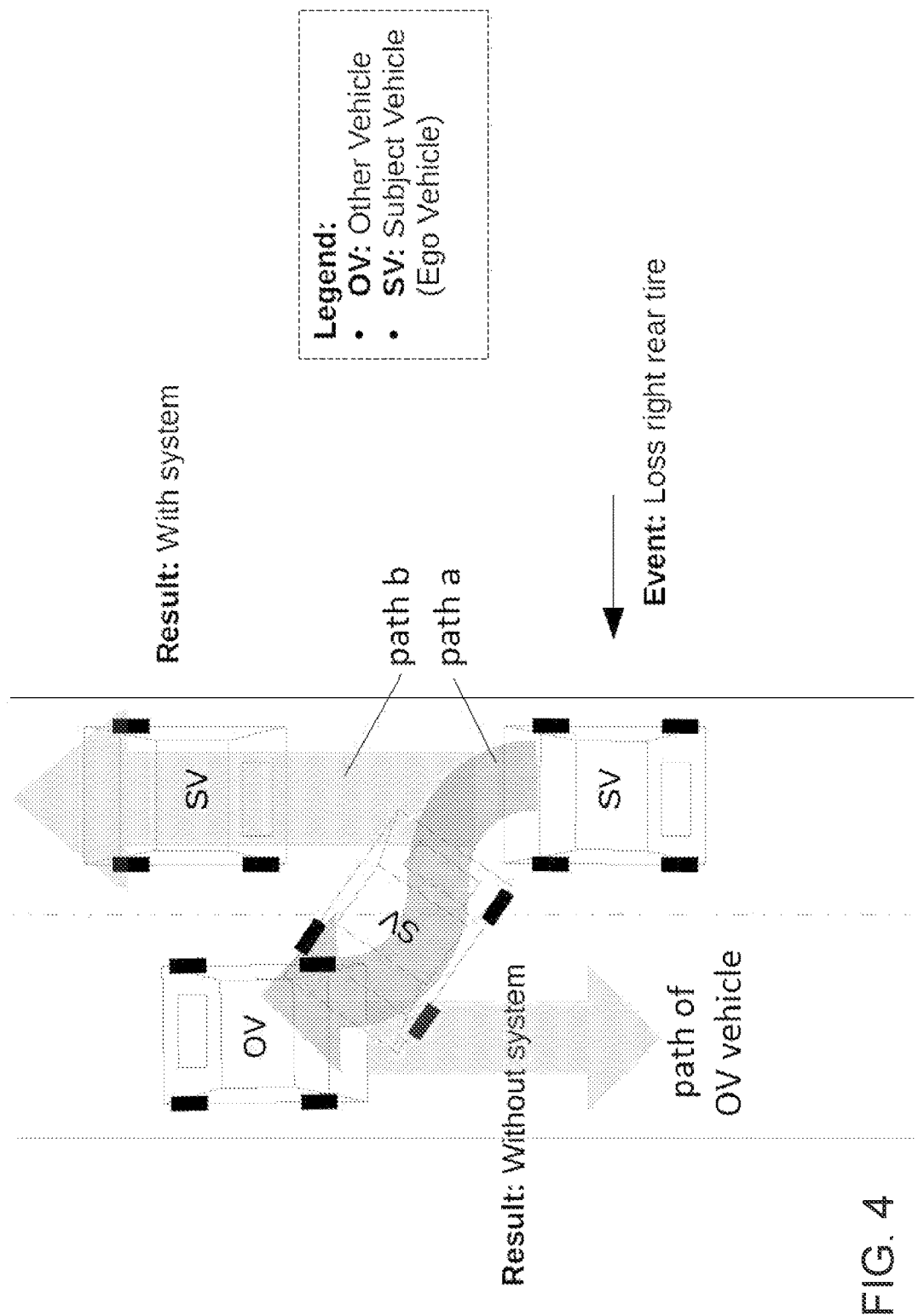
FIG. 4 is a view of a straight two-way traffic street along which a subject vehicle (SV) and an opposing other vehicle (OV) are driving, showing a path 'a' leading the SV into a collision with the OV for a SV not equipped with the control system of the present invention when losing a tire, and showing a safe path 'b' of a SV equipped with the control system of the present invention continuing going straight when losing a tire.

In situations where the desired pathway of the example of FIG. 2 such as shown in FIG. 3 may be a curve (since the lane may be marked in a curve), the system 19 may optionally control the vehicle steering to follow the curve by once controlling the steering angles $\alpha$ and $\beta$ of the steering wheels 22 and 25 into the curve by adding the amount $\eta$ of curvature to the already adjusted angles ($\alpha+\eta$ and $\beta+\eta+A$) plus the additional angle for the outer wheel's wider curvature according Ackermann (A-angle). Optionally, the holding of the desired curvature may be supported or done alternatively entirely by controlling the propelling torque to the outer wheel 22 of the curve while applying brake torque to the inner front wheel 25 (steering torque). Of course, in case the disruptive tire or wheel is a propelled or driven wheel (such as a front wheel for a front wheel drive vehicle or any wheel of an all-wheel drive vehicle), the system may tune or adjust the torque at that wheel either positively nor negatively for minimizing the slip, while controlling the remaining intact propelled or driven wheels with positive or negative torque and the intact passive (unpropelled or undriven) wheels' braking toque in a manner to stabilize the vehicle and to follow the desired path. Optionally, an amount of oversteering may be applied, optionally in combination with applying steering torque.

Thus, the present invention provides advanced control of the vehicle steering and braking and accelerating/decelerating, and may provide such braking and accelerating/decelerating at the individual wheels, responsive to a determination that the vehicle is undergoing an emergency driving condition, such as a blown tire or a slide or skid on slippery surfaces (such as ice, snow, mud, or the like). The system of the present invention may control the steering and wheels of the vehicle to maintain the vehicle moving in the desired direction without immediately stopping the vehicle, such that the system and the driver can maneuver the vehicle to a targeted safe stopping location. The system may determine the path of travel of the vehicle responsive to image processing of image data captured by a forward viewing camera of the vehicle (such as to detect lane markers on the road ahead of the vehicle or to detect the boundaries of the road on which the vehicle is traveling), and the system may control the steering and wheels of the vehicle responsive to the determined lane markers and responsive to a determination of the type of emergency situation experienced by the vehicle and driver.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2™ or EYEQ3™ image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device utilizing aspects of the video display systems described in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008; US-2006-0050018 and/or US-2012-0162427, which are hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for controlling a vehicle to make an emergency stop of the vehicle, the method comprising:
    providing a camera at the vehicle, the camera viewing exterior and at least forward of the vehicle, wherein the camera comprises a CMOS imaging array having at least one million photosensor elements arranged in columns and rows, and wherein the camera is operable to capture image data;
    wherein providing the camera at the vehicle comprises disposing the camera behind a windshield of the vehicle such that the camera views through the windshield and at least forward of the vehicle;
    providing an electronic control unit (ECU) at the vehicle, wherein the ECU comprises an image processor for processing image data captured by the camera;
    capturing image data via the camera as the vehicle travels along a road;
    providing image data captured by the camera to the ECU;
    determining, at least in part via processing at the ECU of image data captured by the camera, presence of a road construction zone at the road along which the vehicle is traveling;
    determining an emergency driving condition as the vehicle travels along the road construction zone of the road;
    responsive to determining the emergency driving condition while the vehicle is traveling along the road construction zone of the road, at least partially controlling via the ECU driving of the vehicle along the road construction zone of the road;
    determining, at least via processing at the ECU of image data captured by the camera, an end of the road construction zone ahead of the vehicle;
    while the ECU is at least partially controlling driving of the vehicle along the road construction zone of the road, and responsive to determining the end of the road construction zone ahead of the vehicle, determining, at least in part via processing at the ECU of image data captured by the camera, a target stopping location ahead of the vehicle at the road along which the vehicle is traveling and after the end of the road construction zone; and
    responsive to determining the target stopping location, at least partially controlling via the ECU driving of the vehicle to the target stopping location.

2. The method of claim 1, wherein, responsive to an input from a driver of the vehicle that is indicative of the driver not wanting to stop the vehicle at the target stopping location, the ECU does not stop the vehicle at the target stopping location.

3. The method of claim 2, wherein the input from the driver comprises the driver accelerating the vehicle.

4. The method of claim 1, wherein the ECU, when at least partially controlling driving of the vehicle, controls steering of the vehicle and at least one selected from the group consisting of (i) braking of the vehicle and (ii) acceleration of the vehicle.

5. The method of claim 1, wherein the ECU determines the emergency driving condition in part responsive to one or more sensors of the vehicle.

6. The method of claim 1, wherein the ECU determines the emergency driving condition responsive at least in part to processing at the ECU of image data captured by the camera as the vehicle travels along the road.

7. The method of claim 1, wherein the vehicle comprises an autonomous vehicle.

8. A method for controlling a vehicle to make an emergency stop of the vehicle, the method comprising:
    providing a camera at the vehicle, the camera viewing exterior and at least forward of the vehicle, wherein the camera comprises a CMOS imaging array having at least one million photosensor elements arranged in columns and rows, and wherein the camera is operable to capture image data;
    wherein providing the camera at the vehicle comprises disposing the camera behind a windshield of the vehicle such that the camera views through the windshield and at least forward of the vehicle;
    providing an electronic control unit (ECU) at the vehicle, wherein the ECU comprises an image processor for processing image data captured by the camera;
    capturing image data via the camera as the vehicle travels along a road;
    providing image data captured by the camera to the ECU;
    determining, at least in part via processing at the ECU of image data captured by the camera, a narrow section of the road along which the vehicle is traveling;
    determining an emergency driving condition as the vehicle travels along the narrow section of the road along which the vehicle is traveling;
    responsive to determining the emergency driving condition while the vehicle travels along the narrow section of the road along which the vehicle is traveling, at least partially controlling via the ECU driving of the vehicle along the narrow section of the road;
    determining, at least via processing at the ECU of image data captured by the camera, presence of a wider section of the road ahead of the vehicle where the road widens from the narrow section of the road;
    while the ECU is at least partially controlling driving of the vehicle along the narrow section of the road, and responsive to determining presence of the wider section of the road ahead of the vehicle where the road widens from the narrow section of the road, determining, at least in part via processing at the ECU of image data captured by the camera, a target stopping location ahead of the vehicle at the wider section of the road; and
    responsive to determining the target stopping location, at least partially controlling via the ECU driving of the vehicle to the target stopping location.

9. The method of claim 8, wherein, responsive to an input from a driver of the vehicle that is indicative of the driver not wanting to stop the vehicle at the target stopping location, the ECU does not stop the vehicle at the target stopping location.

10. The method of claim 9, wherein the input from the driver comprises the driver accelerating the vehicle.

11. The method of claim 8, wherein the ECU, when at least partially controlling driving of the vehicle, controls steering of the vehicle and at least one selected from the group consisting of (i) braking of the vehicle and (ii) acceleration of the vehicle.

12. The method of claim 8, wherein the ECU determines the emergency driving condition in part responsive to one or more sensors of the vehicle.

13. The method of claim 8, wherein the ECU determines the emergency driving condition responsive at least in part to processing at the ECU of image data captured by the camera as the vehicle travels along the road.

14. The method of claim 8, wherein the vehicle comprises an autonomous vehicle.

15. A method for controlling a vehicle to make an emergency stop of the vehicle, the method comprising:
  providing a camera at the vehicle, the camera viewing exterior and at least forward of the vehicle, wherein the camera comprises a CMOS imaging array having at least one million photosensor elements arranged in columns and rows, and wherein the camera is operable to capture image data;
  wherein providing the camera at the vehicle comprises disposing the camera behind a windshield of the vehicle such that the camera views through the windshield and at least forward of the vehicle;
  providing an electronic control unit (ECU) at the vehicle, wherein the ECU comprises an image processor for processing image data captured by the camera;
  capturing image data via the camera as the vehicle travels along a road;
  providing image data captured by the camera to the ECU;
  determining, at least in part via processing at the ECU of image data captured by the camera, that a section of the road along which the vehicle is traveling does not have a shoulder;
  determining an emergency driving condition as the vehicle travels along the section of the road that does not have a shoulder;
  responsive to determining the emergency driving condition while the vehicle travels along the section of the road that does not have a shoulder, at least partially controlling via the ECU driving of the vehicle along the section of the road that does not have a shoulder;
  determining, at least in part via processing at the ECU of image data captured by the camera, presence of a shoulder of the road ahead of the section of the road along which the vehicle is travelling;
  while the ECU is at least partially controlling driving of the vehicle along the section of the road that does not have a shoulder, and responsive to determining presence of the shoulder of the road ahead of the section of the road along which the vehicle is travelling, determining, at least in part via processing at the ECU of image data captured by the camera, a target stopping location ahead of the vehicle where the shoulder is present at the road along which the vehicle is traveling; and
  responsive to determining the target stopping location, at least partially controlling via the ECU driving of the vehicle to the target stopping location.

16. The method of claim 15, wherein, responsive to an input from a driver of the vehicle that is indicative of the driver not wanting to stop the vehicle at the target stopping location, the ECU does not stop the vehicle at the target stopping location.

17. The method of claim 16, wherein the input from the driver comprises the driver accelerating the vehicle.

18. The method of claim 15, wherein the ECU, when at least partially controlling driving of the vehicle, controls steering of the vehicle and at least one selected from the group consisting of (i) braking of the vehicle and (ii) acceleration of the vehicle.

19. The method of claim 15, wherein the ECU determines the emergency driving condition in part responsive to one or more sensors of the vehicle.

20. The method of claim 15, wherein the ECU determines the emergency driving condition responsive at least in part to processing at the ECU of image data captured by the camera as the vehicle travels along the road.

21. The method of claim 15, wherein the vehicle comprises an autonomous vehicle.

* * * * *